Patented Apr. 6, 1937

2,076,166

UNITED STATES PATENT OFFICE 2,076,166

SUBSTITUTED SULPHONIC ACIDS OF HIGH WETTING, DISPERSING, AND EMULSIFYING POWER AND THE PROCESS OF PRODUCING THE SAME

Ernest Segessemann, Newark, N. J., assignor to National Oil Products Company, Harrison, N. J., a corporation of New Jersey No Drawing. Application August 7, 1936, Serial No. 94,798

8 Claims. (Cl. 260—64)

This invention relates to substituted aryl sulphonic acids and more particularly to condensation products of aryl sulphonic acids and terpenes and to a process for making the same.

This application is a continuation-in-part of my application, Serial Number 63,038, filed February 8, 1936 now Patent No. 2,054,140, dated Sept. 15, 1936.

I have found that aromatic compounds substituted in the nucleus by a terpene radical may be obtained by condensing mono- or polynuclear aromatic hydrocarbons or derivatives thereof with terpenes or with their oxygenated derivatives, using sulphuric acid as a condensing agent. I have also found that the condensation products just described may be converted into sulphonic acid derivatives by condensing a sulphonic acid derivative of an aromatic hydrocarbon with terpenes in the presence of a condensing agent, or the process may also be carried out in a single stage by reacting a mixture of aromatic hydrocarbons and terpenes with strong sulphuric acid, the acid in this case acting as a condensing and sulphonating agent. The quantity of sulphuric acid and the other conditions of sulphonation may be adjusted so as to obtain mono- or poly-sulphonic acid derivatives.

The process according to the present invention is applicable to all kinds of aromatic compounds which are capable of sulphonation. They may be mono- or polynuclear aromatic hydrocarbons or their homologues, such as for example, benzene, toluene, xylene, naphthalene, phenols, amines or naphthols.

The condensation may be carried out with open chain or cyclic terpenes or their alcohols, ketones or esters, such as for example, terpineols, borneol, fenchyl alcohol, terpin, terpin hydrate, dipentene or with crude materials rich in terpenes, such as pine oil or turpentine.

The condensing and sulphonating agents suitable in accordance with this invention are sulphuric, fuming sulphuric, acetyl sulphuric or chlorsulphonic acid.

Furthermore, I have found that the above described condensation products may be advantageously modified by further condensation with a compound which is capable of reacting with two molecules of the substituted sulphonic acid by forming a carbon or sulphur bridge between two aromatic nuclei, such as for example, aldehydes, ketones or sulphurhalides.

As examples of suitable aldehydes may be cited aliphatic aldehydes, such as formaldehyde or acetaldehyde, or aromatic aldehydes such as benzaldehyde. As an example of ketones applicable for condensation may be mentioned acetone. Of the sulphurhalides, sulphur-mono-chloride is especially suitable in obtaining a —S—S— bridge between two aromatic nuclei.

All the condensations and sulphonations described in the preceding paragraphs may be advantageously carried out in the presence of an inert solvent such as ethylene chloride or carbon tetrachloride.

I have found that the non-halogenated members of the benzene and naphthalene series and their hydroxy compounds are particularly useful in the formation of the sulphonic acids of their condensation products with unpolymerized terpenes, while in the formation of the bridged products the aromatic compounds are not limited to those above specifically mentioned.

The products obtained in accordance with the present invention in the form of the free acids or their alkali salts are clearly soluble in water and exhibit remarkable wetting, emulsifying and dispersing properties. They can be employed wherever a wetting, cleansing or emulsifying action is required, as for example, in the treatment of textile fibres, in the de-inking of paper stock and in washing spray residues from fruit. They are particularly useful in acid solutions, as for example, in the carbonizing bath or as spreading agents for dilute sulphuric acid used for weed control. They are also applicable in the preparation of emulsions of liquids or solids insoluble in water as for example emulsions of petroleum oils, fatty oils and waxes. Mixtures of the sulphonic acids or their salts with soaps, sulphonated oils or other soap-like materials may also be employed with advantage for instance in the dyebath.

The invention will be described in greater detail in the following specific examples which illustrate typical modifications, but the invention is not limited to these examples. The parts are by weight.

*Example 1*

92 parts of toluene are converted into toluene sulphonic acid by acting on it with 100 parts of fuming sulphuric acid at 100° C. Thereupon the reaction mixture is cooled to 20° C. and a solution of 154 parts of alpha-terpineol in 200 parts of ethylene chloride is added. The mixture is then agitated and while maintaining the temperature between 15° C. and 20° C., 100 parts of fuming sulphuric acid are added. The mixture is then stirred for 4 hours at 20° C.–30° C. At the end of this period the product of reaction is poured into 1500 parts of a 20% salt solution and well stirred. The mass separates into two layers, the lower of which containing the sulphonated condensation product is withdrawn and neutralized with caustic soda solution. The product may be used as such or the solvent may be distilled off.

*Example 2*

108 parts of m-cresol are converted into the corresponding sulphonic acid by acting on it with 200 parts of 100% sulphuric acid at 120° C. The reaction mixture is then cooled to 20° C. and a solution of 154 parts of pine oil in 200 parts of carbon tetrachloride is added. The mixture is stirred well and then 100 parts of fuming sulphuric acid are added, keeping the temperature between 15° C. and 20° C. At the end of six hours the product of reaction is poured into 2000 parts of a 20% salt solution and well agitated. The mass separates into two layers, the lower of which containing the sulphonated condensation product is withdrawn and neutralized with a caustic potash solution. The product may be used as such or after distilling off the solvent.

*Example 3*

To a mixture of 208 parts of naphthalene sulphonic acid and 200 parts of ethylene chloride are added with rapid stirring at 20°–30° C. 154 parts of pine oil, followed by 100 parts of chlorsulphonic acid. The mixture is then allowed to stand for 24 hours. At the end of this period the reaction mass is diluted with 100 parts of water and 38 parts of 40% formaldehyde solution are then added slowly and with stirring, keeping the temperature between 20° C. and 40° C. The mass is then stirred for 1 hour or until the formaldehyde odor has completely disappeared. The product of reaction is then washed in salt solution and neutralized and the solvent is distilled off.

I do not limit myself to the times, temperatures, quantities, chemicals or steps of procedure specifically set forth as these are given simply as a means for clearly explaining my invention.

What I claim is:—

1. The process of preparing sulphonic acids of high cleansing, wetting and emulsifying power which consists in condensing an unpolymerized terpene with a member of the group consisting of the sulpho acids of non-halogenated members of the benzene and naphthalene series and their hydroxy compounds.

2. The process of preparing sulphonic acids of high cleansing, wetting and emulsifying power which consists in condensing an unpolymerized terpene with a sulpho acid of a cresol.

3. The process of preparing sulphonic acids of high cleansing, wetting and emulsifying power which consists in condensing an unpolymerized terpene with a sulpho acid of m-cresol.

4. The process of preparing sulphonic acids of high cleansing, wetting and emulsifying power which consists in condensing an unpolymerized pine oil with a member of the group consisting of the sulpho acids of non-halogenated members of the benzene and naphthalene series and their hydroxy compounds.

5. The process of preparing sulphonic acids of high cleansing, wetting and emulsifying power which consists in condensing an unpolymerized pine oil with a sulpho acid of a cresol.

6. The process of preparing sulphonic acids of high cleansing, wetting and emulsifying power which consists in condensing an unpolymerized pine oil with a sulpho acid of m-cresol.

7. The process of producing sulphonic acids of high cleansing, wetting and emulsifying power which consists in condensing a terpene with a member of the group consisting of the sulpho acids of aromatic compounds of the benzene and naphthalene series, condensing the reaction product with a compound capable of forming a bridge linking together several aromatic nuclei.

8. The process of producing sulphonic acids of high cleansing, wetting and emulsifying power which consists in condensing a terpene with a member of the group consisting of the sulpho acids of a member of the benzene and naphthalene series, condensing the reaction product with an aldehyde capable of forming a bridge linking together several aromatic nuclei.

ERNEST SEGESSEMANN.